United States Patent [19]
Guse et al.

[11] Patent Number: 5,624,162
[45] Date of Patent: Apr. 29, 1997

[54] LONG-WALL MINING MACHINE WITH A WORKING CHAIN

[75] Inventors: Kuno Guse, Witten; Peter Kröninger, Gelsenkirchen; Bernd Hölling, Bochum; Roland Becker, Gelsenkirchen, all of Germany

[73] Assignee: Bochumer Eisenhutte Heintzmann GmbH & Co KG, Bochum, Germany

[21] Appl. No.: 540,234

[22] Filed: Oct. 6, 1995

[30] Foreign Application Priority Data

Oct. 7, 1994 [DE] Germany .......................... 44 35 842.3

[51] Int. Cl.⁶ .............................. E21C 35/12; E21C 35/24
[52] U.S. Cl. .................................... 299/1.6; 299/43
[58] Field of Search .......................... 299/1.6, 76, 78, 299/64, 18, 1.4, 30, 43

[56] References Cited

U.S. PATENT DOCUMENTS

| | | | |
|---|---|---|---|
| 3,968,995 | 7/1976 | Arentzen | 299/76 |
| 4,088,370 | 5/1978 | Jarvis et al. | 299/43 |
| 4,090,601 | 5/1978 | Freed, Jr. | 198/316 |
| 4,260,191 | 4/1981 | Weber | 299/1.6 |
| 4,277,105 | 7/1981 | Taylor | 299/76 X |
| 5,228,751 | 7/1993 | Ramsden, Jr. | 299/1.6 |

FOREIGN PATENT DOCUMENTS

| | | |
|---|---|---|
| 3524338C2 | 1/1987 | Germany . |
| 4236519A1 | 5/1994 | Germany . |

*Primary Examiner*—Frank Tsay
*Attorney, Agent, or Firm*—Herbert Dubno

[57] ABSTRACT

A long-wall mining machine has an operating chain entraining conveyor flights or mining tools and displaceable in a trough which can be provided with rows of sensors of an inductive proximity type responding to the chain and the tools and generating measurement pulse trains which are compared with setpoint pulse trains to signal functional parameters of chain operation. The sag of the chain is determined by a row of sensors and in response to the sag a chain-tension unit can be controlled.

12 Claims, 3 Drawing Sheets

LONG-WALL MINING MACHINE WITH A WORKING CHAIN

FIELD OF THE INVENTION

Our present invention relates to a long-wall mining machine with an endless working chain and a device for monitoring and evaluating functional parameters of the working chain. More particularly the invention relates to a long-wall mining machine of the type in which the working chain is an endless chain traveling in a machine trough between deflection stations defining forward and return stretches of that chain which is provided with conveyor flights for displacing mined material and/or plows or other mining tools for cutting the mined material from the wall of the face of a mine tunnel through which the machine is advanced.

BACKGROUND OF THE INVENTION

Long-wall mining machines of the aforedescribed type generally have at least one of the deflection stations formed as a drive station and a device for determining and evaluating functional parameters of the endless working chain. The latter device can comprise sensors which may be inductive proximity sensors spaced apart and thus arranged to respond to the chain or passage of the flights or mining tools to generate corresponding measurement pulses.

With such mining machines, the device which monitors the functional parameters of the working chain has grown in significance in recent years because it allows the chain tension, the forces upon the chain and the stresses applied upstream and downstream of the working locations to be detected and potential chain breakage to be predicted. The device can serve to alert the operator to the danger of chain breakage or, in the case of automatic machine operations, can shut down the operation in the case of breakage of the development of an incipient condition which can lead to chain breakage.

In one monitoring system as described in Glückauf 127 (1991), No. 17, 18 page 778 to 785, and 128 (1992), No. 3, page 189 to 193), the forces are detected directly as such and the chain sag is determined as a geometrical value. This is not consistent with integration of the technique into modern electronic monitoring and control systems.

In the long-wall mining machine of DE 35 24 338, two sensors are provided at such distances from one another that an increase in the link pitch of the chain can be detected or signaled.

DE 42 36 519 provides overload control of chain drives utilizing the pulses from sensors which detect the speed with which the drive motor operates the chain in a contactless manner and thus enables determination of an actual torque which can be compared to a setpoint torque to allow overload detection.

OBJECTS OF THE INVENTION

It is the principal object of the present invention to provide a long-wall mining machine which enables detection and evaluation of the function parameters of the working chain thereof in a simplified manner and which also enables the control system to be readily integrated into modern electronic operation monitoring systems and control units in a convenient manner.

Another object of this invention is to provide a long-wall mining machine and operating system which facilitates monitoring and control of the function of the endless chain thereof whereby drawbacks of earlier systems can be avoided.

SUMMARY OF THE INVENTION

These objects and others which will become more readily apparent hereinafter are attained, in accordance with the invention, by providing the rows of sensors in regions of at least one of the deflection stations and at least one of the sensor rows for the forward stretch and at least one sensor row for the return stretch of the chain and whereby one sensor row for the return stretch of the chain is disposed in the region of the drive station and is juxtaposed with the return stretch of the drive chain.

The sequence of measurement pulses from this row of sensors is fed to a computer and is compared by the computer with the setpoint pulse sequence. More particularly, the long-wall mining machine can comprise:

a machine trough;

an endless chain in the machine trough formed with a plurality of mining tools and having deflection stations around which the chain passes in a forward stretch and a return stretch, at least one of the stations being formed as a drive station;

at least one row of inductive proximity sensors spaced apart in the trough along the forward stretch and at least one row of inductive proximity sensors spaced apart in the trough along the return stretch in a region of at least one of the stations and responsive to passage of the tools by the sensors for generating respective measurement pulse sequences representing functional parameters of operation of the chain, at least one of the rows of sensors detecting chain sag; and a computer receiving inputs from the rows of inductive proximity sensors including a measurement pulse sequence from the row of sensors detecting chain sag for comparing same with a setpoint pulse sequence and thereby monitoring operation of the chain.

Of course the long-wall mining machine can also have the remaining structure usually provided on such machines, namely, a prime mover which can propel the tracks for advancing the mining machine, any tunnel roof supports which may be desired and, of course, any mechanism which may be necessary to advance the forward stretch of the working chain with its mining tools against the wall to be excavated.

Where the tools are plows which undercut the wall, the machine may be provided with milling the cutter for breaking down the undercut wall to produce the mined product which is displaced by the flights in the trough forming the conveyor to one end thereof where a further conveyor of the machine may carry the excavated or mined product away from the mined face.

Thus the tools may be either flights or excavating plows or both.

The number of inductive proximity sensors in each sensor row can be selected optionally. The greater the number of sensors in each sensor row, the more precisely can the functional parameters of the working chain be determined. In conventional long-wall machines, four to six inductive proximity sensors per row have been found to be sufficient.

In general, the sensors of each row can be spaced apart equidistantly and the sensor rows can be parallel to the direction of travel of the chain or inclined thereto. The sensors can be disposed in bores or windows of the machine trough.

The invention is based upon the fact that a long-wall mining machine of the type described can produce, utilizing such rows of sensors, time-spaced pulses which carry all of the significant information necessary for monitoring the operation of the chain.

The inductive proximity sensors can be utilized to provide digital pulses directly for incorporation of the sensor system directly in a digital information processing system. However, the sensors can also be provided with analog circuits and the information can be processed in an analog mining or converted to digital signals utilizing conventional analog-to-digital converters for digital information processing.

With the long-wall mining machine of he invention, the setpoint pulse sequence which is compared with the measured or actual value signals from the sensors may be produced within the computer by providing the computer with a program for generating the setpoint signals. The computer also, of course, provides the comparison of the actual value time pulse with the setpoint time pulses generated by the program. The program can be specifically generated for each kind of tunneling machine and to take into consideration the different operating conditions and capacities of such machines. However, it is also possible to provide a single program for different types of machines.

According to a feature of the invention, the setpoint pulse sequence is generated by a tachometer which responds to the drive speed of the drive station of the chain.

The row of sensors for the chain sag can be provided in the direction of a possible sag of the chain and this row of sensors can then detect the degree of sag. The chain normally is tensioned so that, in the absence of sag, it can pass this group of sensors so that none of the sensors of the group or only the uppermost sensor responds to the chain.

When, however, there is a chain sag, the chain can then pass one or more sensors disposed below the uppermost sensor and the position of the lowermost sensor juxtaposed with the sagging chain can thus provide a measurement of the degree of sag.

In the system of the invention, the chain can have a chain tensioning device whose control circuit can be connected to the computer for restoring the chain tension should there be a detected sag.

BRIEF DESCRIPTION OF THE DRAWING

The above and other objects, features, and advantages will become more readily apparent from the following description, reference being, made to the accompanying drawing in which.

SPECIFIC DESCRIPTION

Figure 1:
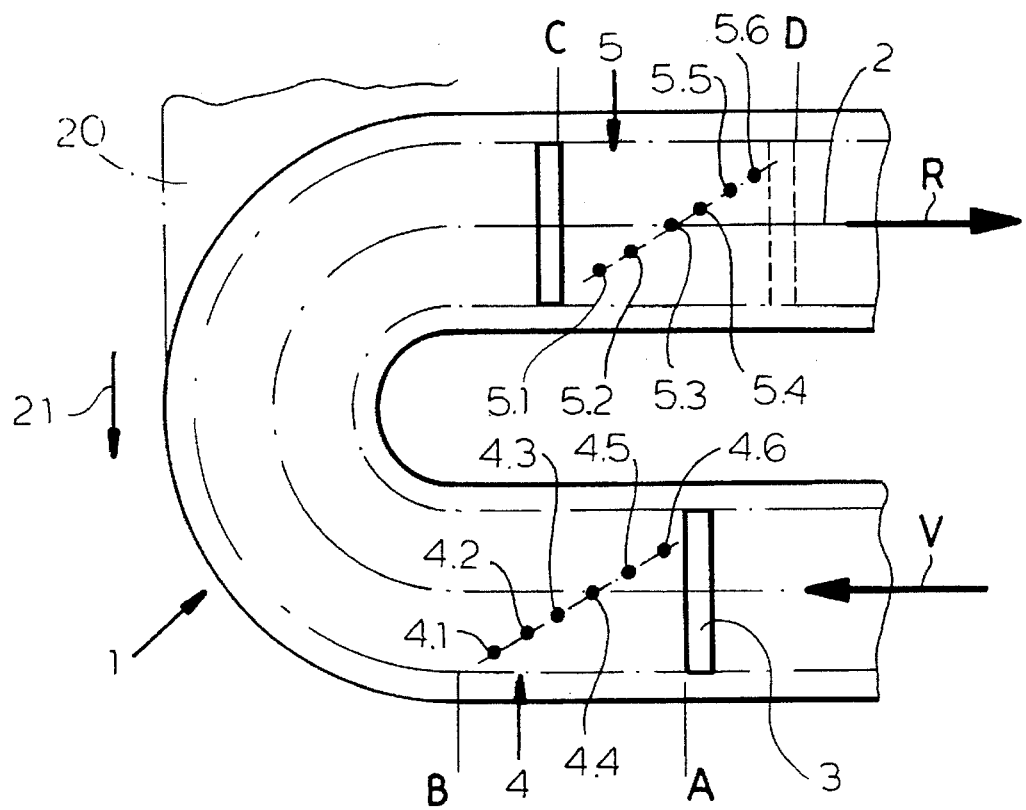
FIG. 1 is a schematic illustration in plan view of a portion of a long-wall mining machine according to the invention.

FIG. 1 diagrammatically shows a portion of a long-wall mining machine which is generally represented at 20 and which is urged in the direction of arrow 21 against a wall of a mine tunnel to be excavated. As is customary with long-wall mining machines, the machine comprises a machine trough 1 which receives a drive chain 2 displaced in the direction of the arrows along a forward stretch V and a return stretch R. The forward stretch thus is a mining stretch and serves to undercut the long wall with, for example, coal plows 22 or other mining tools connected to the chain 2 (see FIG. 3) while the return stretch conveys the mined product to the opposite side of the trough 2 from that shown in FIG. 1, so that the product may be disposed upon a conveyor extending rearwardly to the tunneling machine 20.

The flights 3 serve to entrain the mined product along the trough and are also attached to the chain 2. The elements 3 and 22 thus represent tools spaced along the chain and entrained therewith.

In the forward stretch V, the trough is provided with a row 4 of sensors, comprised of six inductive proximity detectors 4.1 to 4.6. In the return stretch R, the trough has a second row of sensors 5 also comprised of six inductive proximity sensors 5.1 to 5.6

Figure 2:
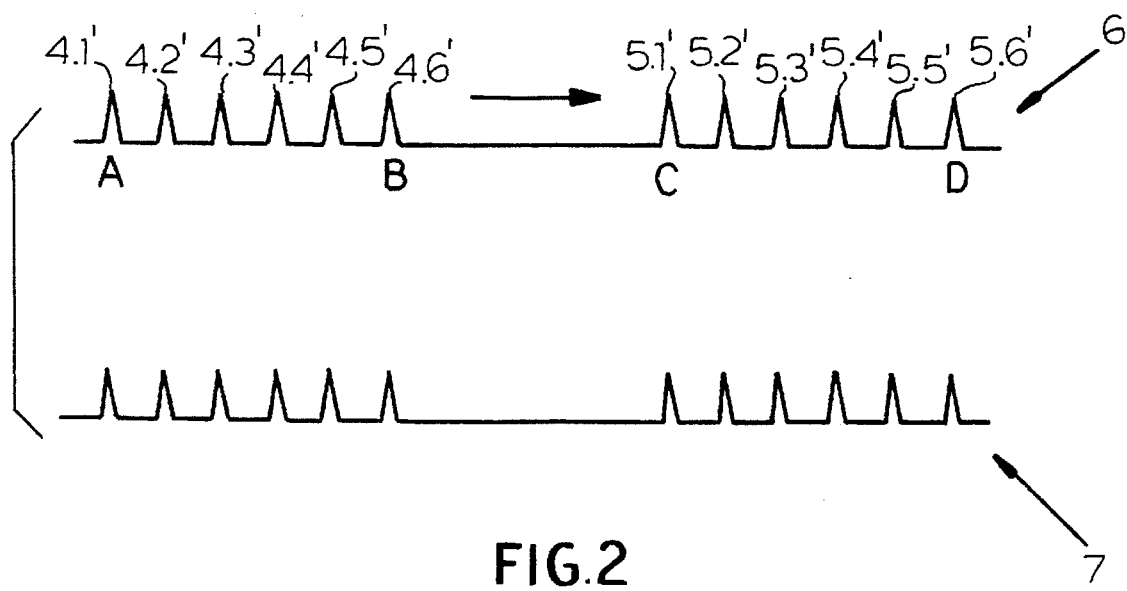
FIG. 2 is a diagram illustrating the sensor signals from the long-wall mining machine of FIG. 1.

As can be seen from the upper diagram of FIG. 2, as the elements 3 or 22 pass the sensors 4.6–4.1 in succession or the sensors 5.1–5.6 in succession, respective pulse trains are generated with respective time-spaced measurement pulses 4.1'–4.6' and 5.1'–5.6' respectively, corresponding to the sensors. The gap between these trains represents the spacing between the two sensor rows as encountered by one of the tools 3 or 22.

The lower sequence of pulses 7 visible in FIG. 2 re the setpoint pulses which can be generated by a program in the computer of which can be derived from a tachometer forming part of the drive for the chain. The actual value represented by the pulse train 6 is compared with the setpoint values represented by the pulse train 7 and the differences between the setpoint and actual values can provide information as to the state of the chain 2. These rows of sensors can thus signal the development of a sag in the chain.

Figure 3:
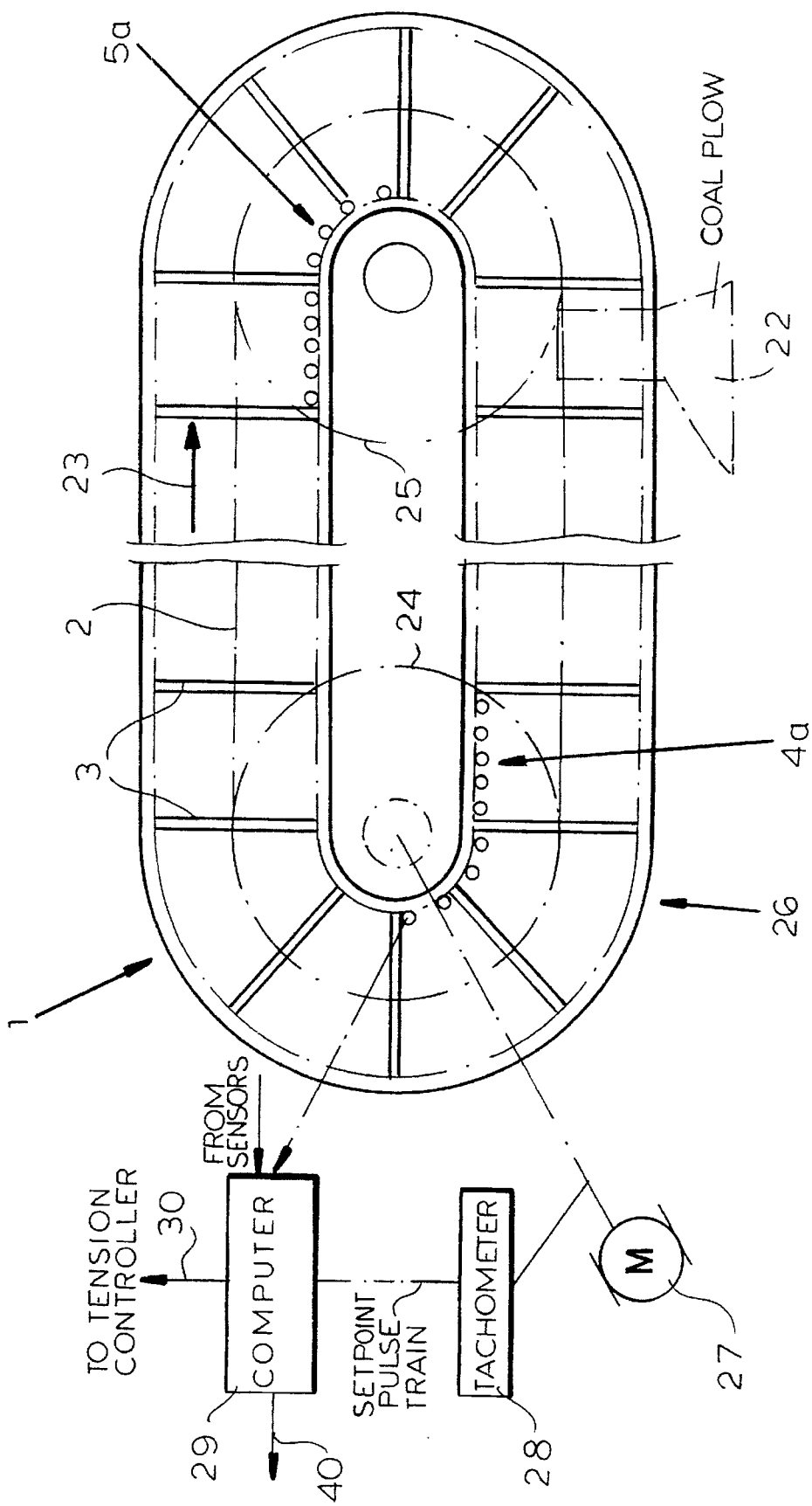
FIG. 3 is a plan view of a portion of another long-wall mining machine according to the invention.
Figure 4:
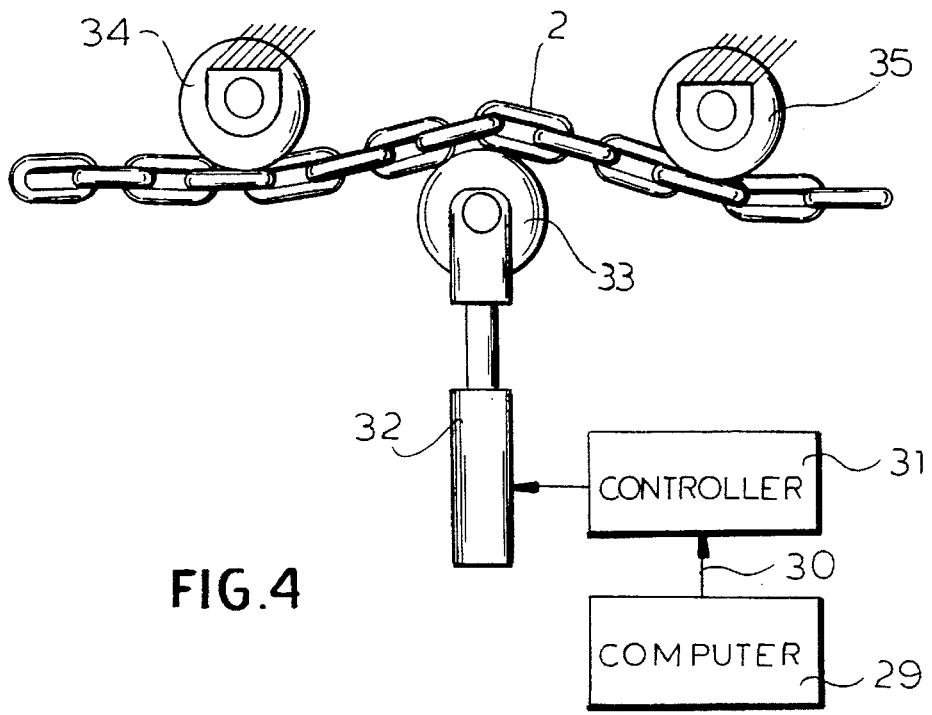
FIG. 4 is a diagram of a chain-tensioning unit for such a machine.
Figure 5:
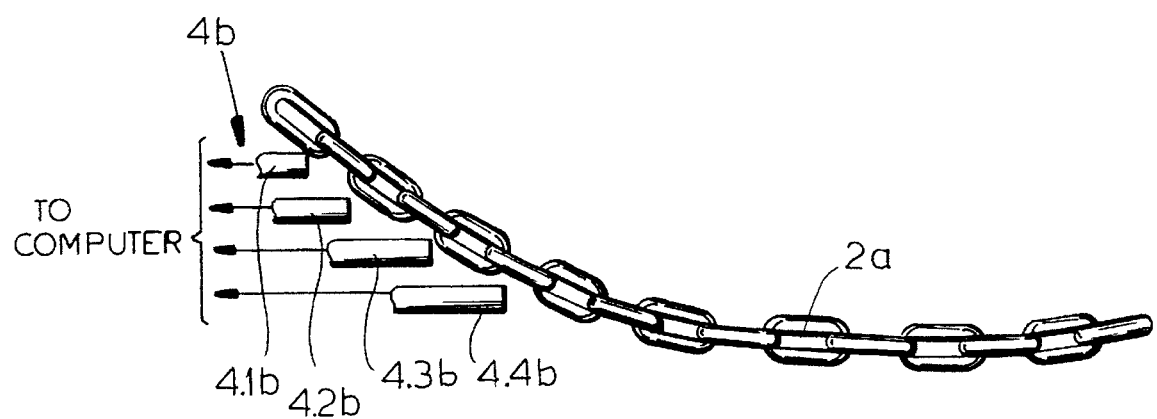
FIG. 5 is a diagram showing a succession of sensors responding to a sagging chain.

As can be seen from FIG. 3, the sensor rows 4a and 5a can extend in the direction of travel of the chain as represented by the arrow 23. In the embodiment of FIG. 1, the rows 4 and 5 of sensors are inclined to the direction of travel of the chain.

FIG. 3 also shows the wheels 24 and 25 at the ends of the conveyor chain around which the chain passes, i.e. the deflecting stations, one of which, namely, the station 26 is formed as the drive station and can have a motor 27, e.g. a hydraulic motor, coupled to the wheel 24 to propel the chain 2 in the direction of arrow 23. The drive can include a tachometer 28 which generates pulses representing the speed of the chain to serve as the setpoint pulses 7 (FIG. 2) or as clocking pulses to synchronize a program of a computer 29 which can generate the setpoint pulses itself. The sensors of the rows 4a and 5a can have their outputs connected directly to the computer 29 in the manner described, or where these outputs are analog outputs, can be connected to the computer 29 by analog-to-digital converters. The output of computer 29 at 30 can be applied to a tension controller.

Referring to FIG. 2, it can be seen that the computer 29 is connected at 30 to a controller 31 which may regulate the position of a cylinder 32 displacing a trailing wheel 33 to deflect the chain 2 between two fixed wheels 34 and 35. In this case, the member 32 is an effector of a servocontrol system which increases the tension should chain sag be detected by a difference resulting from a comparison of the pulse trains by the computer.

In addition or alternatively, a row of sensors 4b may be provided at 4.1b, 4.2b, 4.3b and 4.4b, one above another in a region in which a chain sag 2a can occur so that as the chain sag increases, successively lower inductive proximity sensors of the row 4b will respond to the presence of the chain and signal the degree of sag to the computer which can correct for the sag by adjusting the chain tension in the manner described. The computer can have an output 40 for control of the mining machine or for signalling the operator as to a potential failure or defective operating condition.

We claim:

1. A long-wall mining machine comprising:

a machine trough;

an endless chain in said machine trough formed with a plurality of mining tools and having deflection stations around which said chain passes in a forward stretch and a return stretch, at least one of said stations being formed as a drive station;

at least one row of inductive proximity sensors spaced apart in said trough along said forward stretch and at least one row of inductive proximity sensors spaced apart in said trough along said return stretch in a region of at least one of said stations and responsive to passage of said tools by said sensors for generating respective measurement pulse sequences representing functional parameters of operation of the chain, at least one of said rows of sensors detecting chain sag; and a computer receiving inputs from said rows of inductive proximity sensors including a measurement pulse sequence from said row of sensors detecting chain sag for comparing same with a setpoint pulse sequence and thereby monitoring operation of the chain.

2. The long-wall mining machine defined in claim 1 wherein said rows of inductive proximity sensors are parallel to a direction of travel of said chain.

3. The long-wall mining machine defined in claim 1 wherein said rows of inductive proximity sensors are inclined to a direction of travel of said chain.

4. The long-wall mining machine defined in claim 1 wherein said computer is provided with a program for generating said setpoint pulse sequence and for comparing said measurement pulse sequence from the row of sensors detecting chain sag with the setpoint pulse sequence generated by said program.

5. The long-wall mining machine defined in claim 1 wherein said drive station is provided with a sensor for a drive speed of said chain and generates said setpoint pulse sequence as a function of said speed.

6. The long-wall mining machine defined in claim 1 wherein said sensor for the drive speed is a tachometer.

7. The long-wall mining machine defined in claim 1 wherein said row of sensors detecting chain sag are disposed in the direction of a possible sag of the chain and measure the extent of the sag of the chain.

8. The long-wall mining machine defined in claim 1, further comprising a chain tension device acting upon said chain and having a chain tension setting member responsive to said computer and connected thereto.

9. The long-wall mining machine defined in claim 1 wherein said tools are conveyor flights.

10. The long-wall mining machine defined in claim 1 wherein said tools are mining plows.

11. A method of monitoring the operation of a long-wall mining machine having a machine trough, an endless chain in the machine trough formed with a plurality of mining tools and having deflection stations around which said chain passes in a forward stretch and a return stretch, at least one of the stations being formed with a drive station, the method comprising the steps of:

generating respective measurement pulse sequences from at least one row of inductive proximity sensors spaced apart in said trough along said forward stretch and at least one row of inductive proximity sensors spaced apart in said trough along said return stretch in a region of at least one of said stations and responsive to passage of said tool by said sensors, said measurement pulse sequences representing functional parameters of operation of the chain including chain sag; and comparing at least one measurement pulse sequence from at least one of said rows of sensors with a setpoint pulse sequence thereby monitoring operation of the chain or diagnosing problems with operation thereof.

12. The method defined in claim 11 wherein said setpoint pulse sequence is generated by a program with which a computer is programmed for comparing the measurement pulse sequence with the setpoint pulse sequence.

* * * * *